United States Patent
Boettcher

[15] 3,669,832
[45] June 13, 1972

[54] COATED-PARTICLE FUEL AND FERTILE ELEMENT FOR NUCLEAR REACTORS AND METHOD OF OPERATING SAME

[72] Inventor: Alfred Boettcher, Hangstrasse 11, 51 Aachen, Germany

[22] Filed: Jan. 15, 1968

[21] Appl. No.: 698,009

[30] Foreign Application Priority Data

Jan. 17, 1967 Germany..................K 61180

[52] U.S. Cl. .................176/68, 176/17, 176/91 R, 176/91 SP
[51] Int. Cl. ........................................G21c 3/06
[58] Field of Search .....................176/17–19, 91, 176/91 SP, 68

[56] References Cited

UNITED STATES PATENTS

| 2,994,656 | 8/1961 | Zumwalt | 176/68 |
|---|---|---|---|
| 3,039,945 | 6/1962 | Slack et al. | 176/18 X |
| 3,142,625 | 7/1964 | Wellborn | 176/19 X |
| 3,168,399 | 2/1965 | Takahashi et al. | 75/208 |
| 3,208,912 | 9/1965 | Jaye et al. | 176/16 |
| 3,212,989 | 10/1965 | Fitzer et al. | 176/91 X |
| 3,249,509 | 5/1966 | Blocher | 176/91 X |
| 3,285,826 | 11/1966 | Lang et al. | 176/68 |
| 3,293,135 | 12/1966 | Jaye et al. | 176/17 |
| 3,309,277 | 3/1967 | Jaye et al. | 176/16 |

*Primary Examiner*—Carl D. Quarforth
*Assistant Examiner*—Gary G. Solyst
*Attorney*—Karl F. Ross

[57] ABSTRACT

A fuel element for nuclear reactors which comprises coated fuel and breeder particles in which coated particles containing the fuel have diameters of at most half the diameters of coated particles containing the fertile material, the coated particles being embedded in a graphite shell or received in a vacuum-tight metal shell; the different particle sizes of the coated particles containing the fuel and fertile material mechanical discrimination between them.

6 Claims, 7 Drawing Figures

Alfred Boettcher
INVENTOR.

BY
Karl F. Ross
Attorney

COATED-PARTICLE FUEL AND FERTILE ELEMENT FOR NUCLEAR REACTORS AND METHOD OF OPERATING SAME

My present invention relates to an improved fuel element for nuclear reactors and, more particularly, to a fuel element containing both coated fuel and breeder particles.

The use of "coated particles" containing a kernel of a fissionable reactor fuel or a kernel of a fertile breeder material adapted to be subjected to the neutron flux produced upon fission of a fuel for transmutation into a fissionable material has become common practice in nuclear reactor, especially electric-power producing reactors, wherein the fertile material utilizes excess neutrons in an economical manner, i.e. by producing additional quantities of fuel. In my copending application Ser. No. 518,298, filed Jan. 3, 1966 (now abandoned), I have disclosed the use of fissionable and/or fertile nuclear materials (e.g. uranium and/or thorium oxides or carbides), which are coated with shells of pyrolytically deposited graphite, carbides or oxides for use in gas-cooled reactors. I point out there that the ceramic-coated fuel or fertile substance can be advantageously embedded in a graphite body for introduction into or assembly as part of a nuclear-reactor core. I have also noted in copending application Ser. No. 646,268, filed June 15, 1967 (now U.S. Pat. No. 3,472,734) as a continuation-in-part of application Ser. No. 498,786 (now abandoned), that a fuel or fertile element for a water-cooled or liquid-metal-cooled nuclear-reactor core can comprise a metallic shell of a noncorrodable or corrosion-resistant material, such as Zircaloy and other zirconium-containing alloys, the shell being filled with loosely piled particles of fissionable fuel or fertile material as kernels in the so-called ceramic coating which can include pyrolytic carbon, oxides or carbides. The coating materials are preferably those described in application Ser. No. 646,268 now U.S. Pat. No. 3,472,734 and include pyrolytic carbon and graphite, silicon carbide, beryllium carbide, niobium carbide, zirconium carbide, aluminum oxide, beryllium oxide, zirconium oxide and magnesium oxide. The principles of coated-particle nuclear fuels are more fully discussed in the *"Journal of Nuclear Materials,"* volume 11, pages 1 – 31, 1964. The tubular shell is then hermetically sealed after evacuation to remove air present during the filling operation. The metals of the shell include zirconium alloys, which are described in *Naval Reactor Physics Handbook*, U.S. Atomic Energy Commission, 1964, and *Metallurgy of Zirconium* McGraw Hill Book Company, New York, 1954, stainless steels and molybdenum-nickel alloys. In another copending application (Ser. No. 561,126, filed June 28, 1966 now U.S. Pat. No. 3,413,195) I have pointed out that the coated particles, for improved efficiency, may have a substantially uniform spherical kernel with the coating being of irregular outer configuration with a plurality of generally flat surfaces. The kernel may have a diameter of 50 to 500 microns and even greater, e.g. 1 mm or more, with suitably proportioned coating.

In the commonly assigned copending application Ser. No. 554,339 (filed June 1, 1966 now U.S. Pat. No. 3,403,985), there is described and claimed a method of recovering the components of coated-particle nuclear-reactor fuels in which the coatings are destroyed in a nonaqueous inorganic melt of alkali-metal hydroxides and oxides. Another commonly assigned copending application Ser. No. 631,492 of Apr. 17, 1967, (now U.S. Pat. No. 3,453,090) points out that the coatings of coated particles can be destroyed and the kernels thereof recovered when the particles are treated with a fluid consisting of at least one alkali metal in elemental form at a temperature about 300° and 1,000° C in a vortex-fluorized bed reactor or a rotary-drum reactor, the alkali metal being elemental cesium or potassium.

As noted earlier, the economies of power reactors require the utilization of the excess neutrons generated by fission of a fuel and not necessary for ancillary reactions in breeding additional fuel by suggesting a fertile or breeder substance to the neutron flux. To this end, the fertile substance is introduced into the reactor core. A typical fertile substance is uranium 238, which always must be considered with more or less enriched U 235; an other fertile substance is thorium 232. In most present-day nuclear reactors, the fuel and fertile materials are mixed substantially homogeneously with one another and are introduced together into the fuel elements. A separation of the fertile material from the fuel is only practiced when so-called breeder blankets are employed or enrichment of the proportion of fuel is desired by spiking techniques. The enrichment of a nuclear reactor by spiking involves the introduction of rods or spikes of more or less pure fissile material.

However, the more common process, wherein the fuel and fertile particles are mixed, has the disadvantage that subsequent "working up" or recovery operations must accommodate the two types of materials. The term "workup" is used herein to refer to the treatment of fuel particles which have undergone fission to separate the fission fragments from the recoverable fuel and thus permit the remaining fuel to be enriched or recovered for reuse. When fuel and fertile particles are mixed together, they both must pass through the mechanical and chemical processes which allow recovery of the fuel so that the working up or recovery process is relatively inefficient. This disadvantage is all the more significant when it is recognized that the fertile-material particles can frequently be reused without destruction since a fertile particle may require two or more reactor cycles before sufficient quantities of the fertile substance have transmuted to the desired extent. When these disadvantages are avoided by separating the fuel from the fertile material, reactor inhomogeneity arises and separate handling systems must be provided.

It is, therefore, the principal object of the present invention to provide a fuel and breeder element for a nuclear reactor core in which these disadvantages are avoided and which allows the use of a single element for both breeding and fueling purposes.

Another object of this invention is to provide an improved method of working up or facilitating the working up of the fuel and fertile particles.

I have found, in accordance with the present invention, that it is possible to overcome the disadvantages of earlier systems as enumerated above by providing, in a fuel element for a nuclear reactor, coated particles of the fuel and fertile substances, which particles have kernels of different diameters and are included together in the same fuel element. The kernels of the fuel and fertile substance are encased in the ceramic materials previously mentioned, namely, pyrolytic carbon and the known carbides and oxides described for particle-coating purposes. More specifically, the coating may consist of pyrolytic carbon, graphite, silicon carbide, beryllium carbide, niobium carbide, zirconium carbide, aluminum oxide, beryllium oxide, zirconium oxide or magnesium oxide. According to the principles of this invention, the diameters of the kernel of the fuel and fertile particles are so differentiated that a mechanical separation of the particles by virtue of their size difference or the volume/mass ratio of the particle can be carried out by conventional mechanical-separation techniques. Since in the usual case the volume of the fuel is much less than the volume of the breeder or fertile material, I provide that the kernels of the fuel particles are at most half the diameters of the kernels of the breeder or fertile material, thereby giving rise to a volume of the fissionable kernels of the fuel particles which, at a maximum, are about one-eighth the volume of the fertile-material cores.

According to a more specific feature of this invention, the breeder or fertile material is thorium while the fuel is uranium 235 or 233 and both these substances are fully separated one from the other in the element shell which may be a graphite body or a graphite or vacuum-tight metallic (zirconium or stainless-steel) shell. The separation of the thorium from the uranium by maintaining them in discret particles has the advantage that the use of fuels such as uranium 233 or uranium 235 in particles separated from the particles of the breeder material prevents the fission products of the fuel from passing into and contaminating the particles containing the fertile material and ensures that these fission products remain trapped in the fuel particles. This does not mean that the particles containing fertile material, whose kernels are preferably composed of thorium oxide or thorium carbide, will not contain some uranium 233 produced by conversion and that this uranium 233 will not give rise to fission products during its decay, but the proportion of fission fragments produced in this manner is so small by comparison with the amount of fission products that has contaminated the fertile materials of conventional systems that it is negligible and can generally be disregarded. Thus, when the fissionable substance has reached the desired degree of burnup, the fuel element is removed from the reactor in the usual manner and the particles of fuel and fertile substance separated from one another. The particles containing fertile material can be returned directly, without any significant effect upon the reactor operation as a consequence of the negligible fission-fragment content, be used directly again in new fuel-breeder elements, this being especially desirable when the particles are recovered from vacuum-tight metal shells although it is also possible to recover the fertile particles intact from graphite casings of the type used in gas-cooled high-temperature reactors upon a preliminary destruction of the graphite in the manner set forth in the above-mentioned copending application Ser. No. 631,492 of Apr. 17, 1967. In this latter case, after the desired degree of burnup is attained, the graphite fuel elements are subjected to chemical action and breakdown of the graphite shell to recover the coated particles intact. The coated particles can be separated by conventional mechanical techniques as set forth below. It is, however, also possible to provide a chemical attack on the graphite shell and the coating to recover the stripped fuel and fertile-material kernels as a residue. These kernels, by virtue of their size difference, can be classified by mechanical sifting or sedimentation techniques, cyclonic or vortex particle classification, or other air-separation methods. As will be apparent hereinafter, the particles containing the fuel are generally of a size smaller than the fertile-material particles even in the coated condition and a simple mechanical separation of the two is possible without decomposition of the coating. Thus, the particles have a size of such character that mechanical separation by sifting (e.g. with sized screens) cannot be effectively carried out; however, the fact that the kernels of the particles are of markedly different volumes and sizes results in a volume/weight ratio of the fuel particles to the fertile-material particles which enables differentiation of these particles by cyclonic or vortex separation or sedimentation.

If the coatings of the mixed particles are destroyed, as earlier indicated, mechanical separation is based upon the substantial difference in kernel diameter. Since the fissionable content of the particles containing fertile material is generally relatively low after a single pass of these particles through the reactor, it is not necessary to work up these particles after each reactor cycle. A considerable saving in operating costs is obtained, therefore, when, in accordance with the present invention, the particles containing fertile material are passed through the reactor for several cycles before being worked up to recover their fuel contents. The particles containing fuel are worked up after each cycle, however, and reconstituted in the fuel elements. A still more significant increase in the efficiency of the system is obtained in accordance with the principles previously described because the radioactive decomposition products of the thorium chain, especially thorium 228, are never formed at least not as long as the fuel is uranium 235. Thus the fuel particles are totally free of this thorium component.

However, the present invention may also make use, in a highly desirable way, of uranium 233 as the fuel which, in the neutron-multiplication process in the reactor undergoes the transformation U 233 $(n, 2n)$ U 232; the uranium 232 undergoes $\beta$-decay to thorium 228, thereby giving rise to an increase in the concentration of thorium 228 in the fuel particles. From fuel particles whose kernels consist entirely of uranium 233, it is possible to recover pure thorium 228 which remains in the fuel particles until the particles containing fuel are separated from the particles containing fertile material and thus does not contaminate the thorium 232 of the particles containing fertile material. Thus one is able to obtain valuable thorium 228 without the necessity of separating it from thorium 232 at high cost.

According to a more specific feature of this invention, the coating of the fuel kernel, in proportion to the kernel size, is made thicker than the coating of the breeder-particle kernel. This aspect of the invention is based upon the concept that, during the fission reaction of the fuel, the reaction products include gases which increase the internal pressure within the particle. If the fuel kernels have a diameter (as already set forth in accordance with this invention), which is much smaller than that of the kernels containing fertile material, there is no significant increase in the quantity of fuel present per unit volume. At the same time, the coating of increased thickness provides an augmented barrier to escape of contaminants and is an especially effective seal. The kernels of the particles containing thorium need only a rather thin coating. The thin coating, surrounding a kernel of relatively large volume, occupies little space in the fuel and breeder element, thereby making the system of the present invention particularly effective when the particle mass is loosely piled in metallic shells; the resulting element is then found to have a surprisingly high fuel and fertile-material density. When shells of this character are employed, I prefer to mix particles of two or three different diameters so that the relatively small fuel particles are uniformly distributed in the interstices of the large particles. Thus, it is possible to loosely pile the particles in metallic shells in such fashion that the shell is filled to 90 percent of its volumetric capacity, with more than 50 percent of the shell volume being occupied by fuel or breeder substance.

The kernels may be composed of the fissionable and fertile elementary substances, their oxides, carbides and nitrides. When conventional coated particles are subjected to a high proportion of burnup, the radiation deterioration of the kernels gives rise to a higher proportion of gaseous fission products which are released from the lattice structure. I have now observed that it is possible to avoid these disadvantages by providing thorium 232 as the fertile substance and instead of diluting the fuel with the fertile material, I use a material (such as zirconium carbide or oxide) having a low neutron-absorption capability to dilute the fuel. The advantage remains, when using uranium 233 as the fuel, that the thorium chain of decay products are not present in such quantities that they affect the working up. Similar results are obtained, as is self-evident, when uranium 238 is used as the fertile material of the breeder-particle kernels and the fuel plutonium. It is, however, possible to use uranium 238 as the fertile element with uranium 235 serving as a fuel. In this case, it has been found to be economical to use one class of coated particles of highly enriched uranium and, as the other class, natural uranium or minimally enriched uranium 238.

The above and other objects, features and advantages of the present invention will become more readily apparent from the following description, reference being made to the accompanying drawing in which.

Figure 1A:
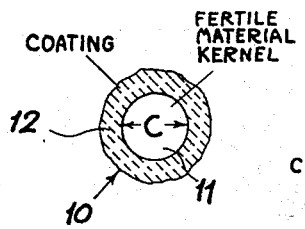
FIGS. 1A and 1B are diagrammatic cross-sectional view through breeder and fuel particles according to the present invention.
Figure 1B:
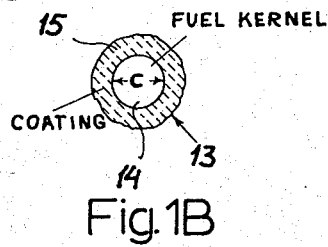

In FIGS. 1A, and 1B, I show respectively a breeder particle having a fertile-material kernel and a fuel particle with a kernel of a fissionable fuel. These particles may be used in the fuel elements of FIGS. 2A and 2B or FIG. 3 and are processed as described in connection with the preferred embodiment of the present method (FIG. 4A) or in accordance with the alternative method illustrated diagrammatically in FIG. 4B. The fertile particle 10 (FIG. 1A) has an overall particle size of 250 to 2,000 microns and consists of a kernel 11 of a fertile material as previously described. This kernel, having a diameter of 200 to 1,500 microns, is surrounded by a coating 12 of a thickness of the order of several hundreds of microns. The coating may be composed of pyrolytic carbon, a ceramic oxide such as aluminum oxide, beryllium oxide or magnesium oxide, or a ceramic carbide such as silicon carbide, beryllium carbide, niobium carbide or zirconium carbide as described in the "*Journal of Nuclear Materials*" (supra). Preferably, the kernel 11 is formed of thorium 232 or uranium 238.

The fuel particle 13 (FIG. 1B) has a kernel 14 of spherical configuration and is composed of uranium 233, uranium 235 or plutonium, or a combination thereof. The kernel 14 has a diameter in the range of 20 to 500 microns while the particle diameter overall is 120 to 1,000 microns. A coating 15 of pyrolytic carbon or one of the ceramic oxides or ceramic carbides set forth for the coating 12 is shown here as well. In accordance with the principles of this invention, the diameter $c$ of the kernel 14 is not greater than half the diameter $C$ of the kernel 11 so that $$\frac{c}{C} \leq 0.5.$$

Figure 2A:
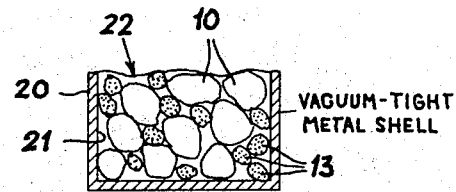
FIGS. 2A and 2B are axial cross-sectional views through fuel and breeder elements in accordance with the present invention.

In FIG. 2A, I show a fuel and breeder element in which the metal shell 20 may be a hermetically sealed vacuum-ight can composed of zirconium, zirconium alloys such as Zircaloy, molybdenum, nickel alloys or stainless steel, whose interior chamber 21 receives a mass 22 of mixed fertile and fuel particles 10, 13 in appropriate proportions as described earlier. The coated particles 13 containing fuel are shown to be of a similar size and are indicated, for clarity, by stippling. These particles have an overall particle size of 120 microns to 1 mm and are here shown to fill the interstices between the particles 10 containing fertile material. The shell is filled to 90 percent of its volume with the particles.

Figure 3:
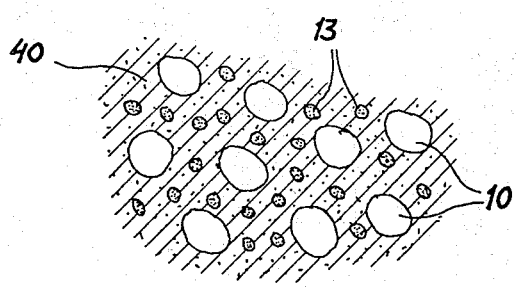
FIG. 3 is a diagrammatic cross-sectional view in accordance with another embodiment of the invention.
Figure 2B:
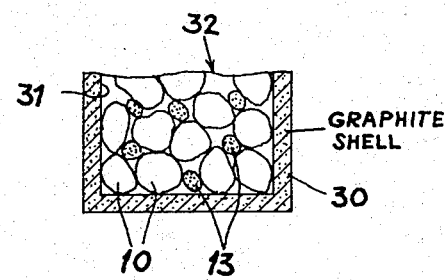

In FIGS. 2B, the fuel element is a graphite shell 30 whose interior chamber 31 is filled with the mass 32 of breeder particles 10 containing kernels of fertile material and, within the interstices of the particles 10, smaller particles 13 whose kernels contain the fuel. Another type of graphite-encapsulated fuel and breeder element embodying the present invention is shown in FIG. 3 in which the element 40 can be seen to have a matrix of graphite in which the relatively large particles 10 with fertile-material kernels are distributed; between these particles 10, the smaller particles 13 with fuel-containing kernels are distributed in the graphite matrix. This graphite body can have any desired shape and may be destroyed by the chemical techniques described in the commonly assigned copending application identified earlier.

Figure 4A:
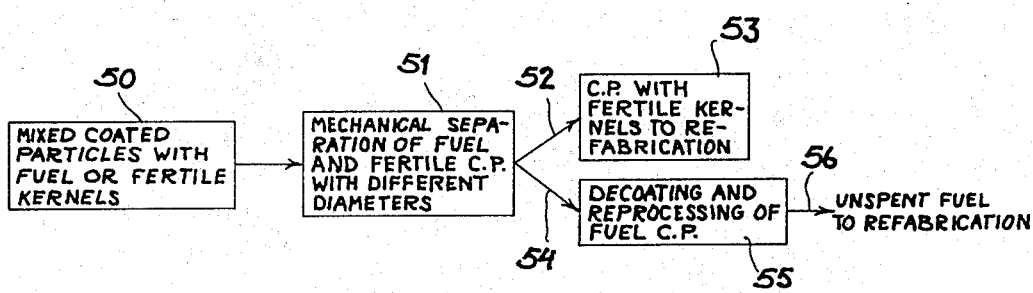
FIGS. 4A and 4B are diagrams of processes for the working up of fuel and breeder elements in accordance with the invention.

In FIG. 4A, I show a preferred embodiment of the process of the present invention. The fuel and breeder element (FIGS. 2A, 2B or 3) is removed from the nuclear reactor core upon the attainment of a predetermined degree of burnup of the fuel kernels as established in accordance with conventional reactor-operating procedures. When the element is a can or shell (FIG. 2A or FIG. 2B), the shell may be opened by conventional technique or, when the element provides a graphite matrix in which the particles are distributed (FIG. 3), the destruction of the matrix is effected by chemical means as indicated earlier. In either case, the mixed coated particles with fuel or fertile kernels are collected at 50 and subjected to mechanical separation at 51 in accordance with the different diameters of fuel and fertile-coated particles. Station 51 represents a cyclonic or other separator designed to discriminate between the fuel and breeder particles because of their size differences and may be a sieve-type classifier. From the separating and classifying station 51, the coated particles with fertile kernels are supplied at 52 to a station 53 at which refabrication of the fuel and breeder element is carried out. The particles 13 having fuel-containing kernels, are led at 54 to a decoating and fuel-reprocessing station 55 at which the particle coatings are removed in the fuel kernels subjected to working up in accordance with usual procedures. Unspent fuel is led at 56 to a refabrication station at which coating of fuel kernels is carried out in the fuel and breeder element manufactured anew. Thus, breeder particles may be reused without working up until the kernels thereof have become enriched to the desired degree.

Figure 4B:
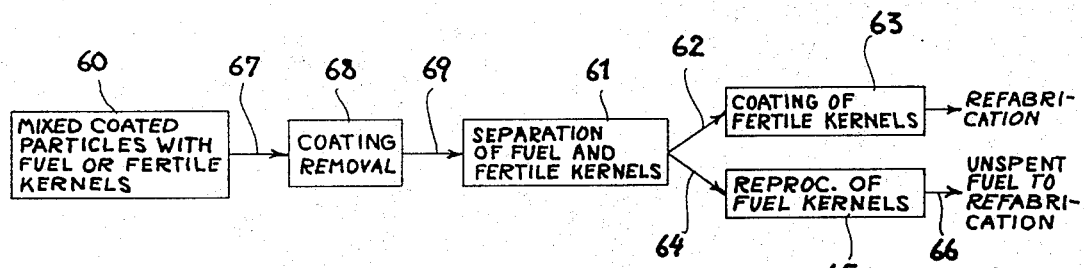

The embodiment of FIG. 4B, however, provides a station 60 from which all of the mixed coated particles with fuel or fertile kernels are led at 67 to a coating-removal station 68. The kernels of fuel and fertile material are then delivered at 69 to a separation state 61 at which the intact fuel and breeder kernels are subjected to mechanical separation in accordance with their size by cyclonic or sieve-type separators as previously described. The fertile kernels may then be led at 62 to a recoating station 63 (without working up of these kernels until the desired degree of enrichment has been attained) whereupon the coated breeder particles may be introduced into new reactor elements. At 64, the fuel kernels are delivered to a reprocessing station 65 from which unspent fuels may be recovered at 66 for recoating and use in fuel elements as described above.

The invention described and illustrated is believed to admit of many modifications within the ability of persons skilled in the art, all such modifications being considered within the spirit and scope of the appended claims.

I claim:

1. A fuel and breeder element for a nuclear reactor, comprising an element shell, a multiplicity of coated particles containing fuel in said shell, said particles having a particle size between about 120 microns and about 1 mm and each including a generally spherical kernel of a fissionable fuel substance, and a coating selected from the group which consists of pyrolytic carbon, a particle-coating oxide and a particle-coating carbide surrounding the kernel, and a multiplicity of coated particles containing fertile material in said shell, said particles containing fertile material having a particle size greater than that of the particles of the fuel substance and between about 250 microns and about 2 mm and each including a generally spherical kernel of a fertile material and a coating therearound selected from the group which consists of pyrolytic carbon, a particle -coating carbide and a particle-coating oxide, the kernels of the coated particles containing the fuel substance/having diameters of at most one half the diameters of the kernels of the coated particles containing the fertile material.

2. An element for a nuclear reactor as defined in claim 1 wherein said element shell is a vacuum-tight metal shell.

3. An element for a nuclear reactor as defined in claim 1 wherein said element shell is a graphite or ceramic-carbide body.

4. An element for a nuclear reactor as defined in claim 3 wherein said body is a graphite shell.

5. An element for a nuclear reactor as defined in claim 1 wherein said fertile material is thorium 232 and said kernels of the particles containing said fissionable-fuel substance also include a diluent for said substance of low neutron-absorbing capabilities.

6. An element for a nuclear reactor as defined in claim 1 wherein said coatings are composed of a material selected from the group consisting of pyrolytic carbon, silicon carbide, beryllium carbide, niobium carbide, zirconium carbide, aluminum oxide, beryllium oxide, zirconium oxide and magnesium oxide, the kernels of said particles containing said fuel substance have particle sizes ranging between 20 and 500 microns, the kernels of said particles containing said fertile material have particle sizes ranging between 200 and 1,500 microns, and said coated particles containing said fuel substance have an overall particle size less than that of the coated particles containing said fertile material and are disposed in interstices between the latter.

* * * * *